(12) United States Patent
Yang et al.

(10) Patent No.: US 8,878,900 B2
(45) Date of Patent: Nov. 4, 2014

(54) NON PHOTOREALISTIC RENDERING OF AUGMENTED REALITY

(75) Inventors: Guang-Zhong Yang, Epsom (GB); Mirna Lerotic, London (GB)

(73) Assignee: Imperial Innovations Limited (GB)

( * ) Notice: Subject to any disclaimer, the term of this patent is extended or adjusted under 35 U.S.C. 154(b) by 897 days.

(21) Appl. No.: 12/666,957

(22) PCT Filed: Jun. 23, 2008

(86) PCT No.: PCT/GB2008/002139
§ 371 (c)(1),
(2), (4) Date: Dec. 28, 2009

(87) PCT Pub. No.: WO2009/004296
PCT Pub. Date: Jan. 8, 2009

(65) Prior Publication Data
US 2010/0177163 A1 Jul. 15, 2010

(30) Foreign Application Priority Data

Jun. 29, 2007 (GB) .................................. 0712690.7

(51) Int. Cl.
| | |
|---|---|
| *H04N 13/00* | (2006.01) |
| *H04N 9/47* | (2006.01) |
| *H04N 7/18* | (2006.01) |
| *A61B 1/04* | (2006.01) |
| *A62B 1/04* | (2006.01) |
| *G06T 15/50* | (2011.01) |
| *G06T 15/02* | (2011.01) |
| *G06T 19/00* | (2011.01) |

(52) U.S. Cl.
CPC ............ *G06T 15/503* (2013.01); *G06T 2210/62* (2013.01); *G06T 15/02* (2013.01); *G06T 19/006* (2013.01)
USPC .................................. 348/45; 348/65; 348/77

(58) Field of Classification Search
USPC .................................. 600/111; 348/45, 65, 77
See application file for complete search history.

(56) References Cited

U.S. PATENT DOCUMENTS

| | | | | |
|---|---|---|---|---|
| 6,151,009 | A | * | 11/2000 | Kanade et al. ................. 345/641 |
| 7,295,720 | B2 | * | 11/2007 | Raskar .......................... 382/312 |
| 7,355,597 | B2 | * | 4/2008 | Laidlaw et al. ............... 345/419 |
| 2007/0070063 | A1 | * | 3/2007 | Sumanaweera ............... 345/419 |

FOREIGN PATENT DOCUMENTS

| | | | | | |
|---|---|---|---|---|---|
| EP | | 2034442 A1 | * | 3/2009 | .............. G06T 11/00 |
| WO | WO 2006099490 A1 | | * | 9/2006 | |

OTHER PUBLICATIONS

Ève Coste-Manière, Louaï Adhami, Fabien Mourgues, Alain Carpentier, Planning, simulation, and augmented reality for robotic cardiac procedures: The STARS system of the ChIR team, Seminars in Thoracic and Cardiovascular Surgery, vol. 15, Issue 2, Apr. 2003, pp. 141-156, ISSN 1043-0679, 10.1016/S1043-0679(03)70022-7.*

(Continued)

*Primary Examiner* — Geepy Pe
(74) *Attorney, Agent, or Firm* — Brooks Kushman P.C.

(57) ABSTRACT

A method and system for rendering a captured image of a scene is disclosed which provide see-through vision through the rendered image, for example of an augmented reality object rendered behind the scene, by assigning pixel transparency values in dependence upon captured image pixels. The method and system preserve some structure of the scene in the rendered image without requiring a model of the scene.

19 Claims, 5 Drawing Sheets

(56) References Cited

OTHER PUBLICATIONS

Takayuki Okatani et al., Shape Reconstruction from an Endoscope Image by Shape from Shading Technique for a Point Light Source at the Projection Center, Computer Vision and Image Understanding, vol. 66, No. 2, May, pp. 119-131, 1997, Article No. IV970613, University of Tokyo, Bunkyo-ku, Tokyo 113, Japan.

Danail Stoyanov et al., A Practical Approach Towards Accurate Dense 3D Depth Recovery for Robotic Laparoscopic Surgery, Computer Aided Surgery, Jul. 2005; 10(4): 199-208, Imperial College London, London, UK.

F. Sauer et al., An Augmented Reality Navigation System with a Single-Camera Tracker: System Design and Needle Biopsy Phantom Trial, Imaging & Visualization Dept., Siemens Corporate Research, Princeton, NJ, USA.

Chris Furmanski et al., Augmented-Reality Visualizations Guided by Cognition; Perceptual Heuristics for Combining Visible and Obscured Information, HRL Laboratories, LLC, Malibu, CA, USA.

H.U. Rashid et al., Differential Algorithm for the Determination of Shape From Shading Using a Point Light Source, vol. 10, No. 2, Mar. 1992, Imperial College of Science, Technology and Medicine, London, UK.

Philip J. Edwards et al., Design and Evaluation of a System for Microscope-Assisted Guided Interventions (MAGI), IEEE Transactions on Medical Imaging, vol. 19, No. 11, Nov. 2000, London, UK.

J. Edward Swann II et al., Egocentric Depth Judgments in Optical, See-Through Augmented Reality, IEEE Transactions on Visualization and Computer Graphics, vol. 13, No. 3, May/Jun. 2007.

George P. Mylonas et al., Gaze Contingent Depth Recovery and Motion Stabilisation for Minimally Invasive Robotic Surgery, Royal Society/Wolfson Medical Image Computing Library, Imperial College London, London, UK.

R.J. Lapeer et al., PC-based Volume Rendering for Medical Visualisation and Augmented Reality based Surgical Navigation, School of Computing Sciences, University of East Anglia, Norwich, UK.

Jurgen Dollner et al., Real-Time Expressive Rendering of City Models, Hasso-Plattner—Institute at the University of Potsdam.

Jan Fischer et al., Stylized Augmented Reality for Improved Immersion, IEEE Virtual Reality, Mar. 12-16, 2005, Bonn, Germany.

Hui Xu et al., Stylized Rendering of 3D Scanned Real World Environments, University of Minnesota at Twin Cities.

Mitsuhiro Hayashibe et al., Laser-Scan Endoscope System for Intraoperative Geometry Acquisition and Surgical Robot Safety Management, Medical Image Analysis 10 (2006) 509-519.

Norihisa Shigemura, MD et al., Long-Term Outcomes After a Variety of Video-Assisted Thoracoscopic Lobectomy Approaches for Clinical Stage IA Lung Cancer: a Multi-Institutional Study, the Journal of Thoracic and Cardiovascular Surgery, vol. 132, No. 3.

Michael Bajura et al., Merging Virtual Objects With the Real World: Seeing Ultrasound Imagery Within the Patient, Computer Graphics, 26, 2, Jul. 1992, Department of Computer Science, University of North Carolina, Chap Hill, NC.

Ronald Azuma et al., Performance Analysis of an Outdoor Augmented Realty Tracking System that Relies Upon a Few Mobile Beacons, Proceedings of the 5th Int'l Symp. On Mixed and Augmented Reality, pp. 101-104, Oct. 2006, Santa Barbara, CA.

Thomas P. Koninckx et al., Real-Time Range Acquisition by Adaptive Structured Light, IEEE Transactions on Pattern Analysis and Machine Intelligence, vol. 28, No. 3, Mar. 2006.

Sebastian Vogt et al., Reality Augmentation for Medical Procedures: System Architecture, Single Camera Marker Tracking, and System Evaluation, International Journal of Computer Vision 70(2), 179-190, 2006.

Mirna Lerotic et al., PQ-Space Based Non-Photorealistic Rendering for Augmented Reality, Lecture Notes in Computer Science, vol. 4792, 2007, Springer Berlin, Heidelberg.

LG Johnson, et al., Surface Transparency Makes Stereo Overlays Unpredictable: the Implications for Augmented Reality, Stud Health Technol Inform, 2003; 94; 131-6.

Tobias Sielhorst et al., Depth Perception—A Major Issue in Medical AR: Evaluation Study by Twenty Surgeons, MICCAI 2006, LNCS 4190, pp. 364-372, 2006.

Christoph Bichlmeier et al., Virtual Window for Improved Depth Perception in Medical AR, Chair for Computer Aided Medical Procedures (CAMP), TU Munich, Germany.

Stoyanov et al. "Dense 3D Depth Recovery for Soft Tissue Deformation During Robotically Assisted Laparoscopic Surgery", MICCAI 2004, LNCS3217, p. 41-48.

Csebfalvi. "Fast Visualization of Object Contours by Non-Photorealistic Volume Rendering", Eurographics 2001, vol. 20, No. 3, 10 Pages.

Edwards et al. "Clinical Experience and Perception in Stereo Augmented Reality Surgical Navigation", MIAR 2004, LNCS 3150, p. 369-376.

Bichlmeier et al. "Improving Depth Perception in Medical AR A Virtual Vision Panel to the Inside of the Patient", Proceedings of BVM 2007, p. 217-221.

King et al. "Stereo Augmented Reality in the Surgical Microscope", Presence Aug. 2000, vol. 9, No. 4, p. 360-368.

Bruckner et al. "Illustrative Context-Preserving Exploration of Volume Data", IEEE Transactions on Visualization and Computer Graphics Nov./ Dec. 2006, vol. 12, No. 6, p. 1559-1569.

\* cited by examiner

NON PHOTOREALISTIC RENDERING OF AUGMENTED REALITY

BACKGROUND OF THE INVENTION

The present invention relates to a method of rendering images, in particular to provide occlusion cues, for example in medical augmented reality displays.

Augmented reality (AR) is becoming a valuable tool in surgical procedures. Providing real-time registered preoperative data during a surgical task removes the need to refer to off-line images and aids the registration of these to the real tissue. The visualization of the objects of interest becomes accessible through the "see-through" vision that AR provides.

In recent years, medical robots are increasingly being used in Minimally Invasive Surgery (MIS). With robotic assisted MIS, dexterity is enhanced by microprocessor controlled mechanical wrists, allowing motion scaling for reducing gross hand movements and the performance of micro-scale tasks that are otherwise not possible.

The unique operational setting of the surgical robot provides an ideal platform for enhancing the visual field with pre-operative/intra-operative images or computer generated graphics. The effectiveness and clinical benefit of AR has been well recognized in neuro and orthopedic surgery. Its application to cardiothoracic or gastrointestinal surgery, however, remains limited as the complexity of tissue deformation imposes significant challenges to the AR display.

Seamless synthesis of AR depends on a number of factors relating to the way in which virtual objects appear and visually interact with a real scene. One of the major problems in AR is the correct handling of occlusion. Although the handling of partial occlusion of the virtual and real environment can be achieved by accurate 3D reconstruction of the surgical scene, particularly with the advent of recent techniques for real-time 3D tissue deformation recovery, most surgical AR applications involve the superimposition of anatomical structures behind the exposed tissue surface. This, for example, is important for coronary bypass for which improved anatomical and functional visualization permits more accurate intra-operative navigation and vessel excision. In prostatectomy, 3D visualization of the surrounding anatomy can result in improved neurovascular bundle preservation and enhanced continence and potency rates.

Whilst providing a useful in plane reference in stereo vision environments, traditionally overlaid AR suffers from inaccurate depth perception. Even if the object is rendered at the correct depth, the brain perceives the object as floating above the surface (See for example Johnson L G, et al, Surface transparency makes stereo overlays unpredictable: the implications for augmented reality, *Studies in Health Technology and Informatics* 2003, 94:131-6; and Swan J E, et al, Egocentric Depth Judgments in Optical, See-Through Augmented Reality, *IEEE Transactions on Visualization and Computer Graphics* 2007, 13(3):429-42).

For objects to be perceived as embedded in the tissue, our brains expect some degree of occlusion. To address the problem of depth perception in AR, a number of rendering techniques and display strategies have been developed to allow for accurate perception of 3D depth of the virtual structures with respect to the exposed tissue surface. In Sielhorst T, et al, Depth Perception—A Major Issue in Medical AR: Evaluation Study by Twenty Surgeons, *Medical Image Computing and Computer-Assisted Intervention—MICCAI* 2006 2006:364-72. the issue of depth perception in medical AR has been studied. In agreement with the two references cited above, it was found that depth perception is poor if the AR object is rendered opaquely as it appears to float above the outer body surface even though rendered at the correct depth behind it. Two ways of improving depth perception were identified: rendering both the body surface and the AR object as transparent or rendering the body surface with a window defined inside it such that the window provides an occlusion clue whereby the AR object can be seen within the window but is otherwise occluded by the body surface. Regarding the former approach (transparent rendering), while this may result in improved depth perception for some surfaces, in general rendering two overlayed transparent surfaces results in conflicting visual cues from occlusion such that depth perception can be poor (see for example Johnson et al cited above). The latter approach (rendering a window) has the disadvantage that all information about the body surface within the window is lost.

In Virtual Window for Improved Depth Perception in Medical AR: C. Bichimeir, N. Navab, International Workshop on Augmented Reality environments for Medical Imaging and Computer-aided Surgery (AMI-ARCS 2006), Copenhagen, Denmark, October 2006 (available online at http://ar.in.tum.de/pub/bichlmeier2006windowfbichlmeier2006window.pdf) various approaches to improving the depth perception obtained with the window approach while maintaining information about the body surface within the window have been studied. The following approaches have been considered: adapting the window shape to the shape of the body surface, rendering the window surface glass-like using highlight effects due to a virtual light source, mapping the window plane with a simple structured texture, simulating a finitely sized frame for the window and setting the background of the AR objects either transparent or opaque. A drawback of all but the last of these approaches is that a 3D model of the body surface must be known so that the window contour or surface can be rendered accordingly. Such a 3D model can be difficult to obtain reliably in particular if the body surface is deforming or changing in other ways during imaging.

SUMMARY OF THE INVENTION

According to one aspect of the invention, there is provided a method of rendering a captured digital image as defined in claim 1.

Advantageously, by setting transparency values of a corresponding non-photorealistically rendered (NPR) image based on the captured image itself it is possible to define a partly transparent window which conserves some of the structure of the image to provide occlusion cues such that depth perception is made possible (in the case of a 2 dimensional rendering of the image) or aided (in the case of 3 dimensional rendering of the image). This approach does not require a model of the scene underlying the image as it is based on the image data itself.

As mentioned above, the NPR image may be rendered as a 2 dimensional view or a second image may be captured to define a stereoscopic view. In any event, a virtual (for example AR) object may be rendered behind the captured image.

The assignment of the transparency values may be done inside a window such that the NPR captured image remains opaque outside the window, occluding the object when it is not seen through the window. For a more natural appearance of the scene or to aid fusing the two windows in a stereoscopic view, the transparency values may be gradually blended from within the window to outside of it. The window position may be defined in dependence upon the viewer's gaze, continuously tracking the viewer's gaze or updating the position only when an update request is received from the viewer. Of course, in case of stereoscopic viewing, the windows in the two (left and right) NPR images may be offset by an amount determined by the camera positions and parameters in accordance with the stereoscopic view.

The transparency values may be determined as a function of a normalised image intensity gradient at corresponding locations in the captured image. Calculating the image intensity gradient may include determining a partial derivative with respect to an image coordinate divided by image intensity at the corresponding locations.

Determining NPR image transparency as set out above can be seen as an example of a method of setting the transparency values by defining a saliency map for an area of the NPR image and assigning transparency values as a function of values of respective corresponding locations in the same saliency map. The saliency map may be arranged to capture salient features of the image, for example features which are salient because they protrude from the background of the underlying scene or because of colour and/or intensity contrast. In particular, the saliency map may be defined as a function of local slopes in a scene underlying the image, for example as estimated based on shading in the image. The local slopes may be estimated as a function of respective normalised intensity gradients in the image.

In addition to assigning transparency values to conserve salient features as more or less opaque and make the background within an area or window more or less transparent, the saliency map may also be used to assign a colour value to a pixel of the NPR image, for example using a colour scale. In particular, the transparency and colour values may be assigned such that an object rendered behind the NPR image is being perceived as being viewed through the transparent area (window) while being occluded by pixels within the area which have high values in the saliency map.

In one application, the virtual object may be derived from medical imaging data, for example CT or MRI images of a tumour. In particular, the images may have been captured using a stereoscopic endoscope, for example during thoracic keyhole surgery. However, it will be understood that the rendering method described above is not limited to medical AR applications but is more generally applicable to AR applications were a virtual object is rendered out of a viewer's normal view behind a captured scene.

In a further aspect of the invention, there is provided a system for rendering a digital image as claimed in claim 21.

In yet a further aspect of the invention there is provided a robotic surgery console as defined in claim 41.

Further aspects of the invention extend to a computer program as defined in claim 42.

For the avoidance of doubt, the term NPR image (short for Non-Photorealistically Rendered image) is used here to designate the captured and processed digital image, applied for example as a texture to a plane corresponding to an image plane in a 3D computer graphics model which may also contain the AR object. Of course, this model may be rendered as a 2D or stereoscopic 3D image.

Embodiments of the invention are now described by way of example only and with reference to the accompanying drawings in which:

DETAILED DESCRIPTION

The underlying idea for the present method of rendering an image as applied to medical AR displays is to render an exposed anatomical surface as a translucent layer while keeping sufficient details to aid navigation and depth cueing. One embodiment is based on pq-space based Non-Photorealistic Rendering (NPR) for providing a see through vision of the embedded virtual object whilst maintaining salient anatomical details of the exposed anatomical surface. To this end, surface geometry based on a pq-space representation is first derived, where p and q represent the slope of the imaged surface along the x, y axes, respectively. For example, this can be achieved with photometric stereo by introducing multiple lighting conditions. For deforming tissue, however, the problem is ill posed and the introduction of multiple light sources in an endoscopic set-up is not feasible. Nevertheless, the problem can be simplified for cases where both camera and a light source are near to the surface being imaged (see Rashid H U, Burger R "Differential algorithm for the determination of shape from shading using a point light source". Image and Vision Computing 1992; 10(2):119_±27, herewith incorporated herein by reference), such as in bronchoscopes and endoscopes. In such cases, the value of image intensity at coordinates x,y for a near point light source is given by $$E(x, y) = \frac{s_0 \rho(x, y) \cos\theta}{r^2} \quad (1)$$

where $s_o$ is the light source intensity constant, $\rho(x,y)$ is the albedo or reflection coefficient, r is the distance between the light source and the surface point (x,y,z), and $\theta$ is the angle between the incident light ray and the normal to the surface $\hat{n}$. In gradient space, the normal vector to the surface is equal to $$\hat{n} = \frac{(p, q, -1)}{\sqrt{1 + p^2 + q^2}} \quad (2)$$

where p and q represent surface slopes in directions x and y respectively. For a smooth Lambertian surface in the scene, image intensity given by equation Eq. 1 can be reduced to $$E(x, y) = s_0 \rho_{average} \frac{(1 - p_0 x - q_0 y)^3}{Z_0^2 (1 - p_0 x_0 - q_0 y_0)^2 (1 + p_0^2 + q_0^2)^{1/2} (1 + x^2 + y^2)^{3/2}} \quad (3)$$

which defines the relationship between the image intensity $E(x,y)$ at the point (x,y) and scene radiance at the corresponding surface point $(x_o Z_o, y_o Z_o, Z_o)$ with surface normal $(p_o, q_o, -1)$, where $\rho_{average}$ denotes the average albedo in a small neighborhood of the surface and $s_o$ is the light source intensity constant. Lambertian surface under point source illumination is an idealised surface material that satisfies two conditions: (1) it appears equally bright from all viewing directions, and (2) it reflects all incident light.

By utilizing partial derivatives of the image intensity in equation Eq. 3, normalised partial derivatives in x/y at image location (x,y), $R_{x/y}$, can be written in terms of only image coordinates and local slopes:

$$R_x = \frac{1}{E}\frac{\partial E}{\partial x} = -3\left(\frac{p_0}{(1-p_0 x - q_0 y)} + \frac{x}{(1+x^2+y^2)}\right) \quad (4)$$

$$R_y = \frac{1}{E}\frac{\partial E}{\partial y} = -3\left(\frac{q_0}{(1-p_0 x - q_0 y)} + \frac{y}{(1+x^2+y^2)}\right)$$

This can be rewritten as two linear equations in $p_0$ and $q_0$ (the normalised partial derivatives or normalised gradient $R_{x/y}$ at image location (x,y) being determinable from the image intensity at (x,y) and its neighbourhood):

$$A_1 p_0 + B_1 q_0 + C_1 = 0$$

$$A_2 p_0 + B_2 q_0 C_2 = 0 \quad (5)$$

with $$A_1 = (-x_0 \cdot R_x + 3)\cdot(1+x_0^2+y_0^2) - 3\cdot x_0^2$$

$$B_1 = -R_x \cdot (1+x_0^2+y_0^2)\cdot y_0 - 3\cdot x_0 \cdot y_0$$

$$C_1 = R_x \cdot (1+x_0^2+y_0^2) + 3\cdot x_0$$

$$A_2 = -R_y \cdot (1+x_0^2+y_0^2)\cdot x_0 - 3\cdot x_0 \cdot y_0$$

$$B_2 = (-y_0 \cdot R_y + 3)\cdot(1+x_0^2+y_0^2) - 3\cdot y_0^2$$

$$C_2 = R_y \cdot (1+x_0^2+y_0^2) + 3\cdot y_0 \quad (6)$$

which gives the following expressions for $p_0$ and $q_0$ at each point (x,y) of the image:

$$p_0 = \frac{B_2 C_1 - B_1 C_2}{B_1 A_2 - A_1 B_2} \quad (7)$$

$$q_0 = \frac{-A_2 C_1 + A_1 C_2}{B_1 A_2 - A_1 B_2} \quad (8)$$

The p and q values of the imaged surface capture 3D details of the exposed anatomical structure and are used to accentuate salient features (that is features protruding from the surface and hence having a high gradient) while making the smoothly varying background surface semi-transparent. It will be understood that the p and q values may be calculated using any suitable technique. To create the desired visual clues, surfaces of the scene that are parallel to the viewing plane (low p, q) are rendered as more or less transparent whilst sloped structures (high p, q) are accentuated and rendered more or less opaque. A measure of the surface slope is generated from the pq-values for each image point (x,y) by $$S(x,y) = \log(\text{abs}(p_0) + \text{abs}(q_0) + 1) \quad (9)$$

where high values of S(x,y) correspond to large gradients. In effect, this provides a saliency map or salient image. The logarithm squashes high values of p and q to limit the dynamic range for display purposes. A smooth background map B is created by applying a wide Gaussian filter to the saliency map S, thereby smoothing out high frequency variations in the image likely to represent noise or minor surface variations rather than "true" salient features. The salient and background images are combined using a mask such that low pixel values of S are replaced with the value of B at the corresponding (x,y) pixel, as described in detail below.

Figure 1:
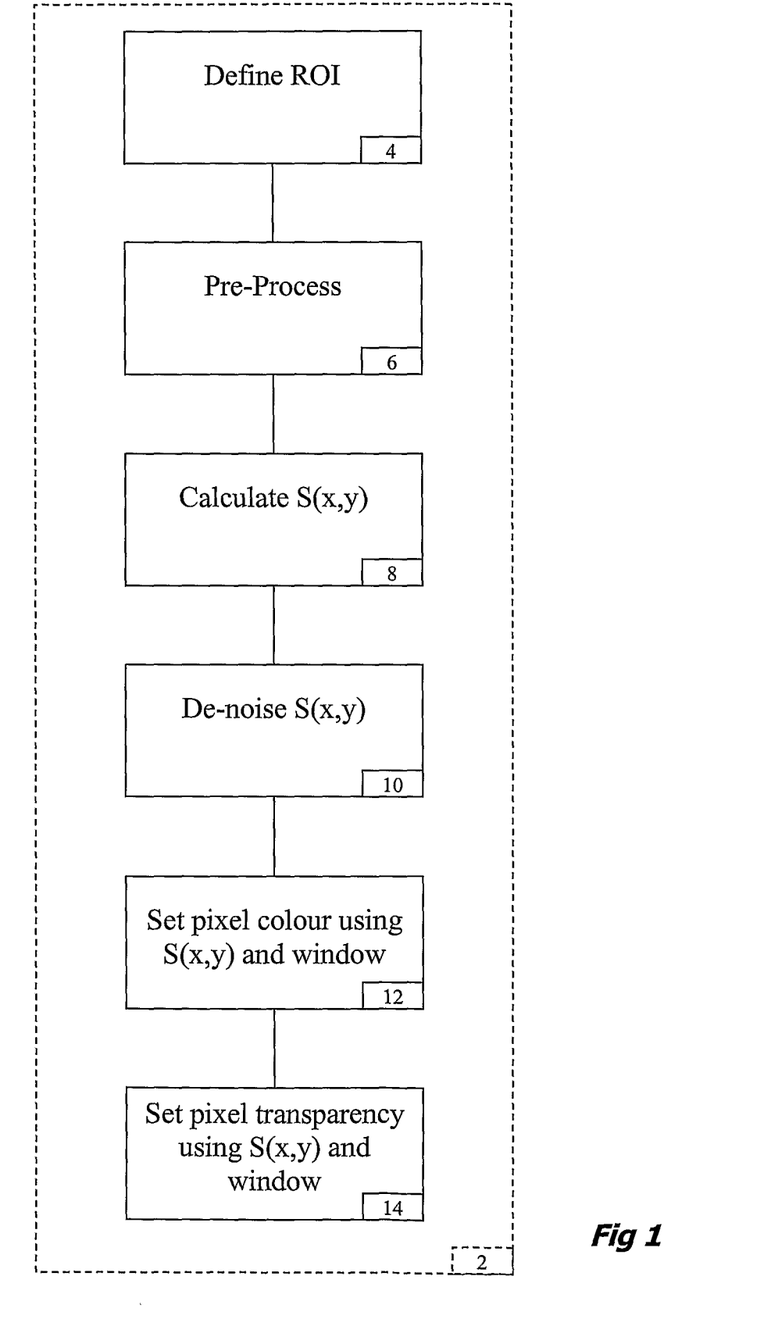
FIG. 1 is a flow diagram of a method for non-photorealistic rendering of at least part of an image, for example to reveal an object rendered behind the scene captured in the image.

Turning to the practical application of the above saliency map, with reference to FIG. 1, in a method 2 of producing a non-photorealistic rendering of a captured image (or an area thereof) for use as a texture projected on an image plane in a computer graphics model, at step 4 a region of interest (ROI) is defined for NPR processing. This may include the entire image or a sub area thereof. At step 6 the region of interest is pre-processed including converting the pixel colour values (if in colour) to grey-scale and applying a mild smoothing function such as a 3×3 pixels Gaussian. At step 8, the saliency map is calculated from the captured image in the ROI as described above using any known method for calculating the partial derivatives, for example simply differencing the pixel values of the pixel in question with a neighbouring pixel in the relevant (e.g. x) direction. The map is calculated from the partial derivative and image intensity (for example grey-scale value) at each pixel or location in the ROI.

Figure 5:
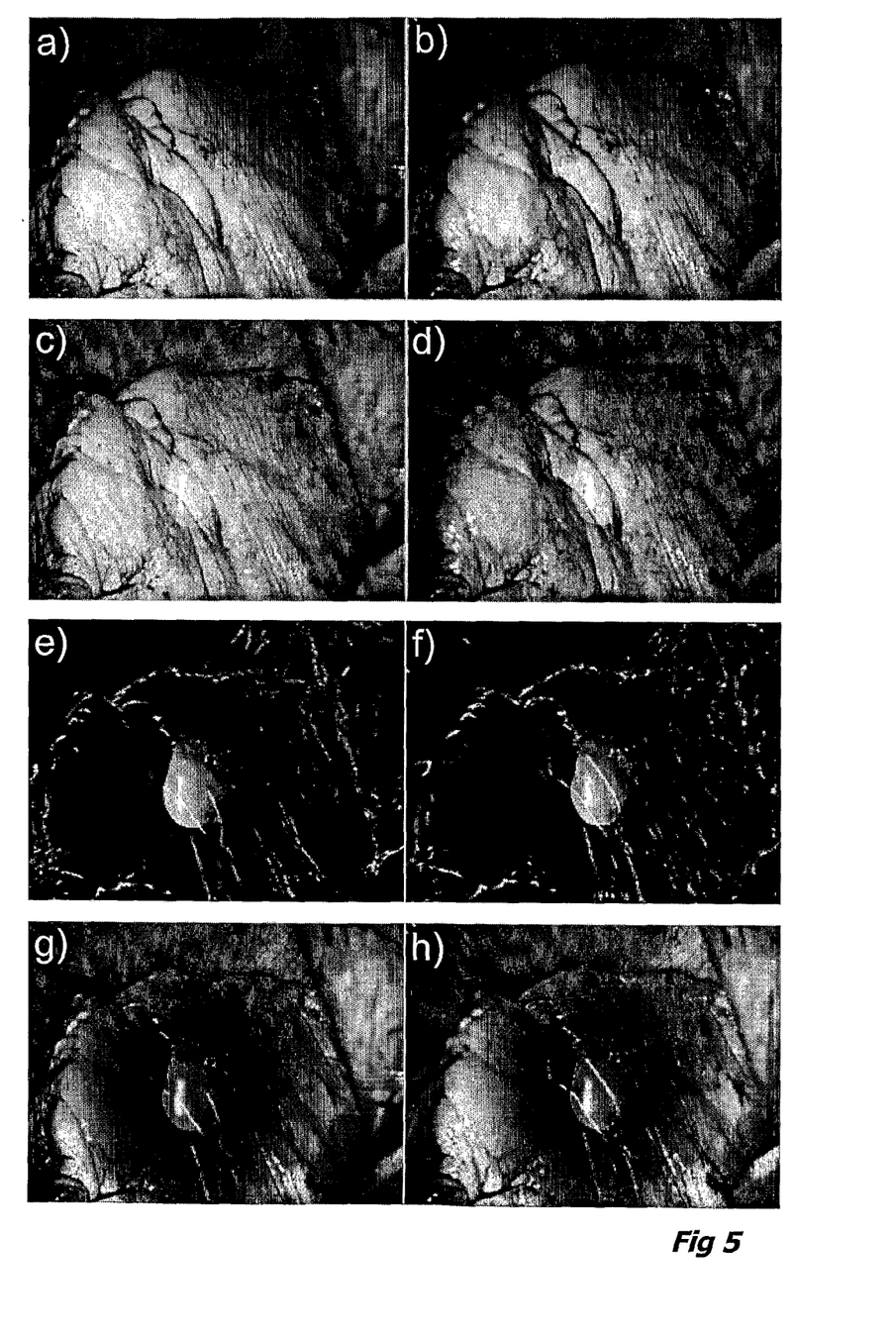
FIG. 5 depicts an example of an AR view rendered using the described method.

At step 10 the saliency map is denoised by combining it with the smooth background map B (for example B can be derived from S by applying a broad Gaussian filter of 6×6 pixels with a spread of 7 pixels). S and B are combined in accordance with a mask function as $$S(x,y) = \text{mask}(x,y)\cdot S(x,y) + (1-\text{mask}(x,y))\cdot B(x,y) \quad (10)$$

such that the saliency map is blended with the background map whereby S dominates where S is high and B dominates where S is low. The mask function can be defined using splines with a few control points (for example a Catmull Rom spline). A suitable mask function is depicted in FIG. 5 as a function of S(x,y). Of course, other mask functions can also be employed, for example a step function with a suitable threshold value for S(x,y). Another example could be a suitable polynomic function.

At step 12, the pixels within the denoised region of interest are assigned colour values in accordance with the saliency map S(x,y) using a colour scale. A suitable colour scale can range from black for the minimum value of S through blue to white for the maximum value. These artificial colours are applied to the NPR image in accordance with a window function, for example a radial window function f(r) such that the artificial colour is applied within the window and the original colour of the image remains outside the window. One example of f(r) is a step function, in which case the window would have a sharp edge discretely switching from artificial to image colour. To achieve a smooth transition, f(r) defines a transition region in another example $$f(r) = \begin{cases} \frac{r^2}{r_0^2} & \text{for } r < r_0 \\ 1 & \text{for } r \geq r_0 \end{cases} \quad (11)$$

where $r^2 = (x-x_{center})_2 + (y-y_{center})^2$ and $r_0$ determines the window size. By defining a smooth transition, fusing the two (left and right) windows in a stereo image (see below) may be helped if applicable.

At step 14, the NPR image pixel transparency within the same window is set in accordance with S(x,y) and the window function f(r) such that the lowest value of S corresponds to fully (or nearly fully, say 95%) transparent and the maximum value of S corresponds to fully (or nearly fully, say 95%) opaque and the transparency values are blended with the remainder of the NPR image using f(r), for example.

For the avoidance of doubt, an example of the blending operation using f(r) can be seen as blending the processed Non-Photorealistic Rendered Image (NPI) with the Captured Image (CI) to arrive at the NPR image as follows:

$$\text{NPR image} = f(r) \cdot \text{CI} + (1 - f(r)) \cdot \text{NPI}. \quad (12)$$

The placement of the window (that is the origin of f(r) in the above example ($x_{center}$, $y_{center}$)) can be set in a number of ways. For example, in some embodiments the window position is predefined based on the position of an AR object to be rendered behind the image plane, in particular if there is only a single object to be rendered within the field of view. Alternatively, in some embodiments the window position may be determined based on a viewer's gaze (for example detected using an eye tracker device), either updated continuously or in accordance with a viewer's fixations when the viewer issues a request for the window position to be updated (or in some embodiments, if no window is presently displayed, the window is displayed in accordance with the viewer's fixation when the window is switched on). This dynamic window display may be particularly useful if a full AR scene is being rendered rather than a single object.

Figure 2:
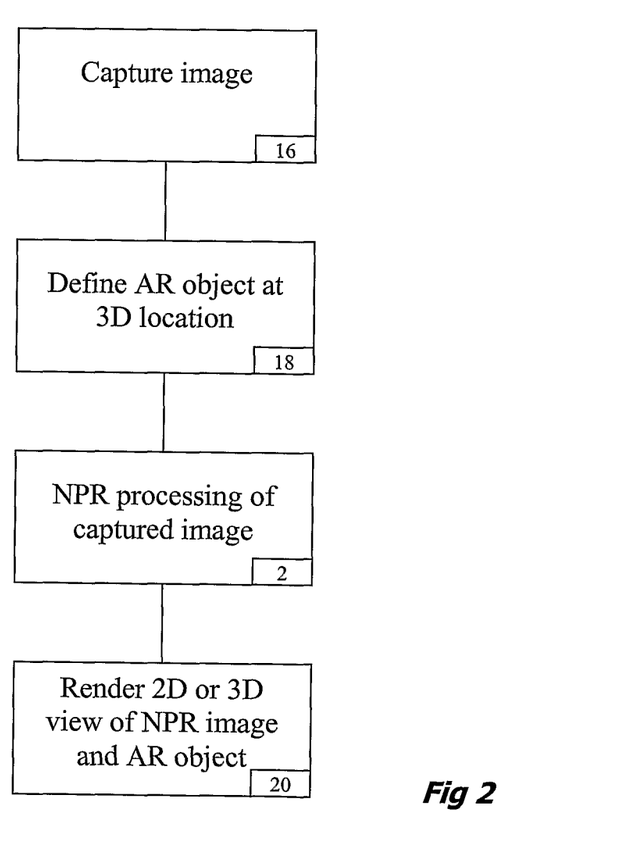
FIG. 2 is a flow diagram of an algorithm for rendering of a corresponding NPR image and AR object in 2D or 3D.
Figure 3:
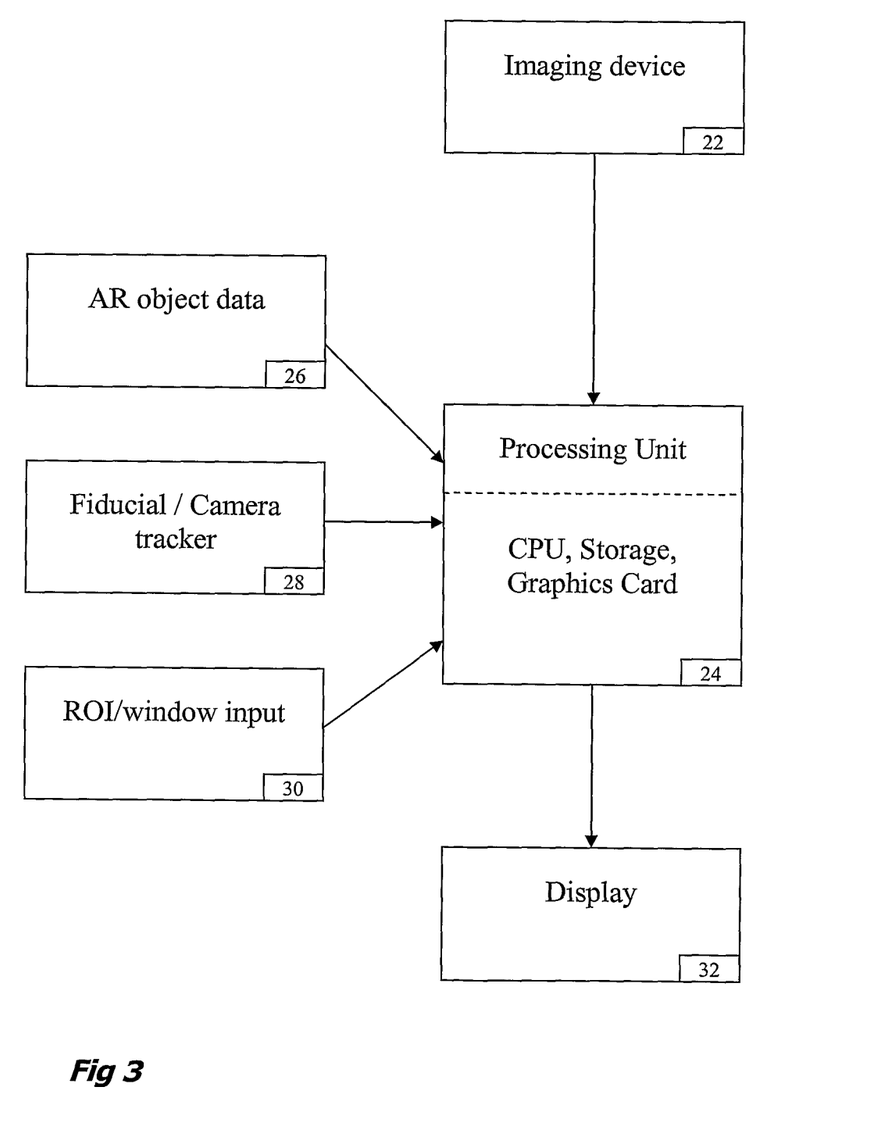
FIG. 3 depicts a corresponding system.
Figure 4:
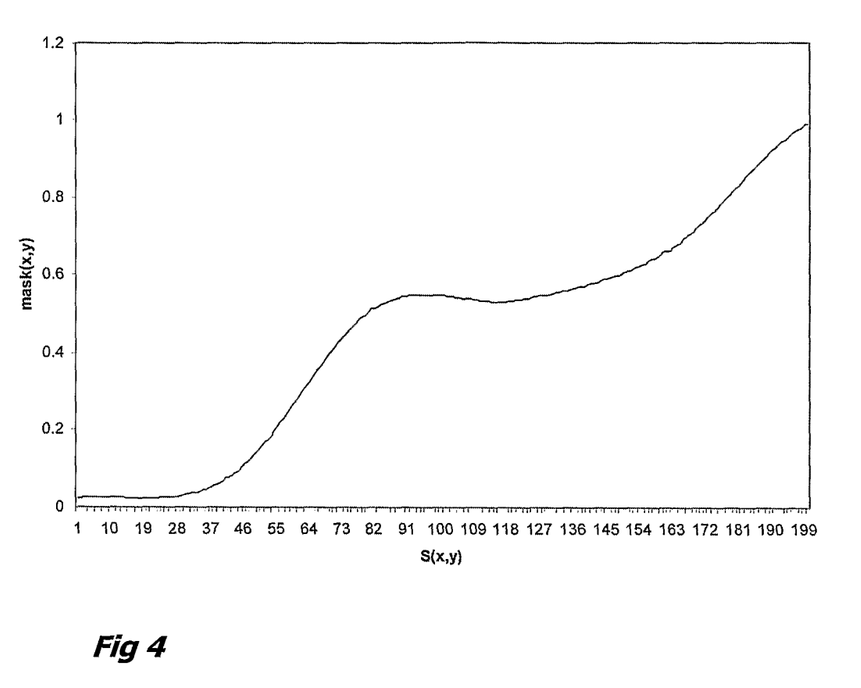
FIG. 4 depicts a mask function used in the processing.

With reference to FIGS. 2 and 3, a system and method for displaying a captured image of a scene together with an augmented reality object is now described. At step 16, an image of the scene is captured by an imaging device 22 and transmitted to a processing unit 24. The captured image is treated as a texture projected onto a scene plane object to be displayed in a computer graphics model in some embodiments. The computer graphics model may be implemented in a number of ways, for example using the OpenGL graphics library in a C++ program in some embodiments.

The correct perspective (and disparity in the case of 3D rendering) is already contained in the captured image (left and right captured image in the case of a stereo camera imaging device) but the depth information about the augmented reality object in the computer graphics model is important to consistently handle occlusion.

For stereo cameras and displays, the position of the augmented reality object in the left and right view has to match disparity in the captured images. This is achieved through stereo camera calibration with provides necessary transformations between the views. In the combined scene the captured images are displayed in the same position for both left and right views as they already contain the disparity, whereas the augmented reality object is rendered at different positions for left and right views so as to match the disparity of the captured images. The transformations obtained as part of a stereo camera calibration are utilized using OpenGL transformations in some embodiments.

In some exemplar implementations, an OpenGL window is opened for each (left and right) display and the NPR image is displayed (for example, applied to a scene plane object acting like a projection screen) in each window at an appropriate depth (see below). The AR object is then rendered for each window using the camera calibration for the respective (left and right) camera. Similarly, the relative position of the ROI and/or window in each of the OpenGL windows is set using the camera calibration data to be consistent with the stereoscopic view in some implementations. In this respect, smoothly blended windows will assist in fusing the two windows in a stereoscopic view even if the window displacement is not exactly in accordance with the stereoscopic view. For example, one approximation suitable for a stereoscopic endoscope camera is to use the camera displacement as the window displacement in some implementations.

To ensure that each pixel is coloured correctly, the z coordinate of the NPR image (the scene object plane) must be closer to the camera position in the computer graphics model than the position of the AR object in the camera frame such that pixels take the colour values of the scene object where the scene object occludes the AR object behind it (or where low transparency parts of the scene object dominate the colouring of the corresponding pixels). Since the occlusion cues provided by the non-photorealistic processing discussed above are only necessary when the AR object lies behind the surface captured by the imaging device 22 (otherwise the real object would be visible in the captured image), it is assumed for rendering in some embodiments that the scene object is always in front of the AR object and, for example, the frontal plane of the viewing frustrum of the computer graphics model is used as the scene object on which the captured image(s) are projected in some implementations. This ensures correct handling of occlusion without influencing the perspective or disparity of the captured image(s) which are defined by the real camera positioning.

Alternatively, in some implementations the NPR image is positioned at or close to the camera focal plane or the depth of the scene plane could be recovered using range finding to set the NPR image depth (see for example Stoyanov D., et al, *Computer Aided Surgery July* 2005, 10(4): 199-208, herewith incorporated herein by reference). Techniques which are used for depth recovery in some embodiments include the use of the observer's vergence from eye tracking (Mylonas GP et al, Proceedings of the second International Workshop on Medical Imaging and Augmented Reality, MIAR (2004), Beijing, 311-319), depth recovery from stereo such as sparse techniques, shape from shading or a combination of the two (Stoyanov D et al, MICCAI (2) 2004: 41-48) or the use of structured light (Koninckx T P and Van Gool L, IEEE PAMI, vol 28, no. 3, 2006), fiducial markers or laser range finding (Mitsuhiro H et al, Medical Image Analysis 10 (2006) 509-519), all herewith incorporated herein by reference.

At step 18 the location of the virtual AR object in the computer graphics model is determined. An AR object input 26 provides coordinate data of the AR object obtained from medical imaging, for example from MRI or CT data. This data must be expressed in coordinates in a frame of reference fixed on a patient's body, for example using fiducial markers fixed on the patient's body before the images are obtained to convert the image data from the medical imagining device frame to a body frame of reference.

For accurate display of the AR object together with the captured scene image the AR objects coordinates from the body frame of reference defined by the fiducial markers need to be transformed into the imagining device camera frame of reference from reference frame input 28 which tracks both camera position and orientation as well as the fiducial markers, for example by tracking the fiducial markers using a 3 dimensional tracking device to determine the position and orientation of the body frame of reference relative to the camera frame of reference, as is well known in the art.

If the camera position is known (for example in the case of a robotic surgery console in which the location of the camera can be derived from the position of the robotic arm supporting the camera) this known position in a coordinate frame fixed to the operating room is used together with the tracker data to perform the necessary coordinate transformation in some implementations particularly relevant to applications in a robotic surgery console. In other setups where the cameras are more mobile (such as in a head mounted video see-through arrangement) camera position also needs to be tracked to be able to perform the required coordinate transform. Details of the required measurements and transformation are described in Vogt S. et al, Reality Augmentation for Medical Procedures: System Architecture, Single Camera Marker Tracking and System Evaluation, *International Journal of Computer Vision* 2006, 70(2): 179-190, herewith incorporated herein by reference.

At step 2 (it will be understood that the order of steps is not limited to the one shown in FIG. 2 but the steps can be performed in any order, of course subject to the constraint that an image must be captured before it can be processed), NPR processing of the captured image is carried out as described above with reference to FIG. 1, possibly taking an input about the window position from window position input 30 which, in some embodiments, includes an eye tracker and user interface for switching the window on or off and selecting a window position, for the window described above.

Once the captured image has been processed and applied as an NPR image to the scene object and the 3D location of the AR object has been defined as described above, the scene object and AR object are rendered for display on the display device 32 at step 20. This may be a 2D view of the corresponding computer graphics model where the display device is a simple monitor or a 3D view consisting of a left and right image where the display device is stereo capable.

In some embodiments, the system and method described above are incorporated in a minimally invasive robotic surgery console, for example the da Vinci robotic surgical console by Intuitive Surgical, Inc, Mountain View, USA. The console provides robotic manipulation for remotely controlling minimally invasive surgical tools and stereo visual feedback via a fixed position stereo display device providing respective left and right images from a stereoscopic endoscope to each eye of the operator. The captured images are processed as described above and can then be rendered together with an AR object (e.g. representing a tumour).

FIGS. 5 *a* and *b* show respective left and right eye views of lung tissue from a robotic assisted lung lobectomy. FIGS. 5 *c* and *d* show the same view with a transparent AR overlay of an AR object in which both the scene and the object are rendered transparently as in the see-through video approach of Vogt et al, referenced above. FIGS. 5 *e* and *f* depict respective left and right views of the scene of FIGS. 5 *a* and *b* processed using the method described above together with the AR object and figures g and h show the views of a and b and e and f, respectively, combined using a smooth radial window. As can clearly be seen, the window provides for a more natural interpretation of the 3 dimensional scene as the AR object is seen through the window while the preserved features in the window maintain reference information for the surgeon and also provide additional depth cues by occlusion.

It will be understood that many modifications to the embodiments described above are possible. For example, more than one object may be displayed and the order of the method steps as described above can be altered at will within the constraints that certain steps require the result of certain previous steps. Moreover, the above-described method for determining transparency values which preserves salient features of an image while providing see-through vision to an underlying object at the same time will be applicable to many other kinds of scenes, objects and applications than the ones described above.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a carrier or storage medium or storage media. The storage media, such as, one or more CD-ROMs solid state memory, mageneto-optical disk and/or magnetic disks or tapes, for example, may have stored thereon instructions, that when executed by a system, such as a computer system, computing platform, or other system, for example, may result in an embodiment of a method in accordance with claimed subject matter being executed, such as one of the embodiments previously described, for example. One embodiment may comprise a carrier signal on a telecommunications medium, for example a telecommunications network. Examples of suitable carrier signals include a radio frequency signal, an optical signal, and/or an electronic signal.

As one potential example, a computing platform or computer may include one or more processing units or processors, one or more input/output devices, such as a display, a keyboard and/or a mouse, and/or one or more memories, such as static random access memory, dynamic random access memory, flash memory, to and/or a hard drive.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the scope of claimed subject matter.

The invention claimed is:

1. A method comprising: (i) rendering a captured two-dimensional digital image captured by a non-volumetric imaging camera and defined by a plurality of image pixels as a non-photorealistically rendered two-dimensional NPR image defined by a plurality of NPR image pixels each having an associated NPR transparency value, wherein the transparency value of at least some of the NPR image pixels is determined in dependence upon corresponding captured image pixels; and (ii) rendering a separately derived virtual object behind the NPR image such that at least part of the virtual object is visible.

2. The method as claimed in claim 1 including rendering a further captured image as a further NPR image to define a stereoscopic view.

3. The method as claimed in claim 1, including defining a window within the NPR image and assigning the transparency values within the window in dependence upon corresponding captured image pixels.

4. The method as claimed in claim 3 including defining a window position in dependence upon a viewer's gaze.

5. The method as claimed in claim 1 including determining the transparency values as a function of a normalised image intensity gradient at corresponding locations in the captured image.

6. The method as claimed in claim 1 including defining a saliency map for an area of the captured image and assigning a transparency value to a pixel of the NPR image as a function of a corresponding value of the saliency map.

7. The method as claimed in claim 6 including assigning a color value to a pixel of the NPR image as a function of a corresponding value of the saliency map, in which the transparency and color values are assigned such that an object rendered behind the NPR image is being perceived as being viewed through the area where values of the saliency map are lower while being occluded where the saliency map has higher values.

8. The method as claimed in claim 1 in which the object is derived from medical imaging data.

9. A system for rendering a captured two-dimensional digital image captured by a non-volumetric imaging camera and defined by a plurality of image pixels as a two-dimensional NPR image defined by a plurality of NPR image pixels each having an associated transparency value, the system including a transparency calculator arranged to calculate the transparency value of at least some of the NPR image pixels in dependence upon corresponding captured image pixels; and the system further arranged for rendering a separately derived virtual object behind the NPR image.

10. The system as claimed in claim 9 which is arranged to render a further captured image using the transparency calculator as a further NPR image to define a stereoscopic view.

11. The system as claimed in claim 9 in which the transparency calculator is arranged to assign the transparency values within a window within the NPR image.

12. The system as claimed in claim 11 which includes a windowing module having an input representative of a viewer's gaze for defining a window position in dependence upon the viewer's gaze.

13. The system as claimed in claim 9 in which the transparency calculator is arranged to determine the transparency values as a function of a normalized image intensity gradient at respective corresponding locations in the captured image.

14. The system as claimed in claim 9 in which the transparency calculator is arranged to define a saliency map for an area of the captured image and to assign a transparency value to a pixel of the NPR image as a function of a corresponding value of the saliency map.

15. The system as claimed in claim 14 in which the transparency calculator is arranged to define the saliency map as a function of local slopes in the scene underlying the captured image.

16. The system as claimed in claim 14 which includes a color calculator arranged to assign a color value to a pixel of the NPR image as a function of a corresponding value of the saliency map, in which the NPR image transparency calculator and the color calculator are arranged to assign the respective values such that an object rendered behind the NPR image is being perceived as being viewed through the area where the saliency map has lower values while being occluded where the saliency map has higher values.

17. The system as claimed claim 9 wherein the virtual object is derived from medical imaging data.

18. A robotic surgery console for minimally invasive surgery including a stereoscopic endoscope for capturing stereoscopic images of a surgical scene and a stereoscopic viewing arrangement for viewing the captured images, the console including a system as claimed in claim 9 arranged to render images received from the stereoscopic endoscope and display them on the stereoscopic viewing arrangement.

19. A non-transitory computer readable medium encoding a computer program that, when run on a computer, implements the method as claimed in claim 1.

* * * * *